United States Patent
Voigt

(10) Patent No.: US 8,866,058 B2
(45) Date of Patent: Oct. 21, 2014

(54) OPTICAL TRANSCEIVER AND METHOD OF OPERATION THEREOF

(75) Inventor: Sven Voigt, Freiburg (DE)

(73) Assignee: Northrop Grumman LITEF GmbH, Freiburg (DE)

(*) Notice: Subject to any disclaimer, the term of this patent is extended or adjusted under 35 U.S.C. 154(b) by 348 days.

(21) Appl. No.: 13/261,171

(22) PCT Filed: Jul. 22, 2010

(86) PCT No.: PCT/EP2010/004511
§ 371 (c)(1),
(2), (4) Date: Mar. 28, 2012

(87) PCT Pub. No.: WO2011/015290
PCT Pub. Date: Feb. 10, 2011

(65) Prior Publication Data
US 2012/0199722 A1    Aug. 9, 2012

(30) Foreign Application Priority Data

Aug. 4, 2009  (DE) .......................... 10 2009 036 022

(51) Int. Cl.
G01J 1/32       (2006.01)
G01C 19/72      (2006.01)
H04B 10/572     (2013.01)

(52) U.S. Cl.
CPC ............ *G01C 19/721* (2013.01); *H04B 10/572* (2013.01)
USPC ....................................................... 250/205

(58) Field of Classification Search
USPC ........................................ 250/205; 356/460
See application file for complete search history.

(56) References Cited

U.S. PATENT DOCUMENTS

| 5,008,889 A |  | 4/1991 | Wilson |
| 6,134,253 A |  | 10/2000 | Munks et al. |
| 7,326,915 B2 |  | 2/2008 | Kaluzhny et al. |
| 7,450,858 B2 | * | 11/2008 | Verdiell ......................... 398/164 |
| 2004/0094698 A1 |  | 5/2004 | Imaki et al. |
| 2005/0089280 A1 | * | 4/2005 | Kumar et al. .................... 385/88 |
| 2009/0166508 A1 | * | 7/2009 | Huang et al. ............... 250/201.1 |

FOREIGN PATENT DOCUMENTS

| DE | 601 28 658 T2 | 11/2002 |
| DE | 103 07 524 A1 | 9/2004 |
| EP | 0 990 117 B1 | 4/2000 |
| JP | 07-128071 A | 5/1995 |
| JP | 2002-026440 A | 1/2002 |
| JP | 2003-051786 A | 2/2003 |
| JP | 2006-086950 A | 3/2006 |
| JP | 2006-229067 A | 8/2006 |
| JP | 2009-545746 A | 12/2009 |
| JP | 2011-015256 A | 1/2011 |
| WO | WO 93/11589 | 6/1993 |

* cited by examiner

*Primary Examiner* — Thanh Luu

(74) *Attorney, Agent, or Firm* — Elliott N. Kramsky

(57) ABSTRACT

An optical transceiver comprises a substrate having a temperature control device, a light source, a light-guiding fiber, a detector, optics for collimating the light from the light source, coupling optics for focusing the light beam into the light-guiding fiber, and a beamsplitter which sends one part of the collimated light beam into a wavelength stabilization unit and another part of the collimated light beam into the coupling optics. A wavelength stabilization unit detects and compensates for wavelength drift of the light source. The optical transceiver has a superluminescent diode for its light source and may, for example, be integrated in a fiber-optic gyro.

17 Claims, 3 Drawing Sheets

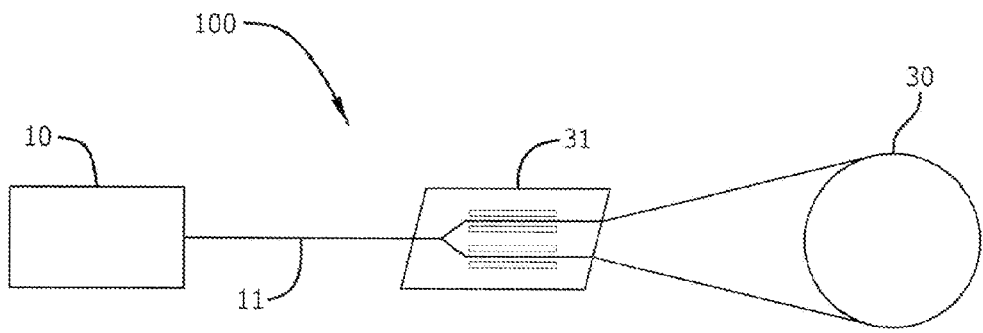
FIG. 5
FIG. 6
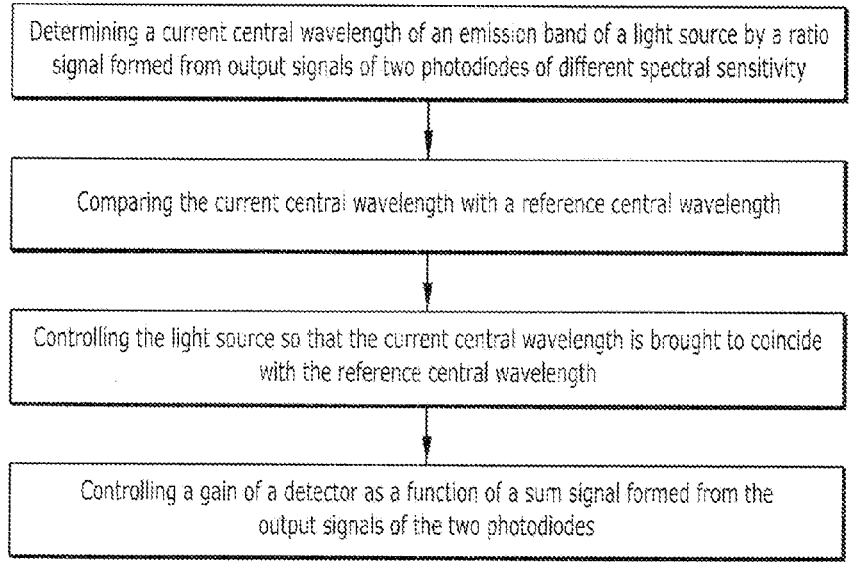

OPTICAL TRANSCEIVER AND METHOD OF OPERATION THEREOF

BACKGROUND

1. Field of the Invention

The present invention is directed to optical transceivers and methods for their operation.

2. Description of the Prior Art

Fiber-optic gyros are employed, for example, in navigation systems. Fiber-optic gyros for use in inertial navigation systems (INS), requiring high accuracy, are typically based on highly stable superfluorescent light sources with wavelengths of about 1550 nm. The wavelength dependency of superfluorescent light sources upon temperature at 1550 nm is typically 10 ppm/° C. Its improvement to about 0.05 ppm/° C. can only be achieved by using wavelength-stabilizing elements such as thermally compensated Bragg gratings.

Superluminescent light-emitting diodes (SLDs) are inexpensive semiconductor light sources that are significantly less stable. This has previously prevented their use in fiber-optic gyros for systems having high accuracy requirements. SLDs have comparatively low scale factor accuracy which results primarily from their wavelength instability. For instance, the wavelength of an SLD is strongly temperature-dependent with temperature drift of about $|d\delta/dT|=400$ ppm/° C. Another cause of wavelength instability is the aging typical of semiconductor sources. As a result, the wavelength of the SLD increases and the power delivered decreases with increasing operating time.

German patent application DE 103 07524 A1 describes a method for sending the spectrum of an SLD onto an external wavelength reference for stabilization in the form of one or two fiber Bragg gratings. The required technology is complex and expensive. Furthermore, additional light losses are to be expected.

U.S. Pat. No. 7,228,022 B1 describes an integrated optical transceiver comprising a superluminescent light source and a temperature regulating unit. Light radiated by the light source is coupled via the light waveguide into a fiber-optic gyro. Light extracted from the fiber-optic gyro is sent into the detector.

SUMMARY AND OBJECTS OF THE INVENTION

It is therefore an object of the present invention to provide an economical optical transceiver as well as a fiber-optic gyro comprising such a transceiver and a navigation system comprising such a fiber-optic gyro.

It is another object of the present invention to provide a method for operating an optical transceiver.

The present invention achieves the above and other objects by providing, in a first aspect, an optical transceiver. Such transceiver includes a light source that can be controlled by a drive current. It emits light that is radiated by the optical transceiver.

A wavelength stabilization unit is provided for stabilizing the wavelength of the light emitted by the light source. Such wavelength stabilization unit includes a sensor device for detecting wavelength drift and a control unit that is connected to both the sensor device and the light source for controlling the driver current as a function of the sensor signals to counteract wavelength drift.

The configuration of such an optical transceiver makes it possible to use superluminescent diodes as the light source of the optical transceiver. The optical transducer may for example be integrated into a fiber-optic gyro, which may expediently be used in an inertial navigation system.

In another aspect, the invention provides an operating method for an optical transceiver. Such method is begun by determining a current position of an emission band of the light source of the transceiver. Thereafter the current position is compared with a reference position of the emission band. Such light source is controlled so that the current position of the emission band is brought to coincide with the reference position.

The preceding and other features of the invention will become further apparent from the written description that follows. Such written description is accompanied by a set of drawing figures. Numerals of the drawing figures correspond to those of the written description with like numerals referring to like features throughout both the written description and the drawing figures.

BRIEF DESCRIPTION OF THE DRAWINGS

FIG. 5 is a simplified overview of a fiber-optic gyro comprising an optical transceiver in accordance with another embodiment of the invention; and FIG. 6 is a flow diagram of a method in accordance with the invention for controlling the output wavelength of a light source.

DETAILED DESCRIPTION OF THE PREFERRED EMBODIMENT

Figure 1:
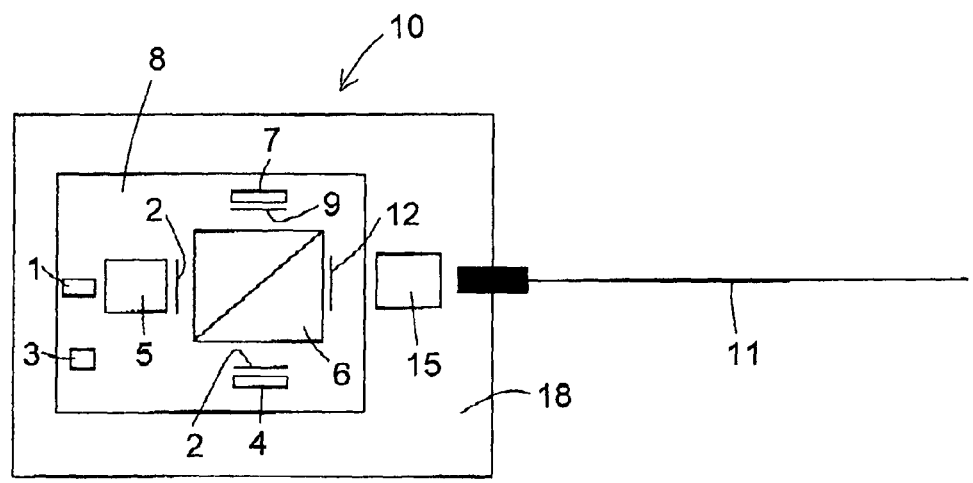
FIG. 1 is a schematic plan view of a portrait of an optical transceiver in accordance with an embodiment of the invention.

FIG. 1 is a schematic plan view of an optical transceiver 10 in accordance with an embodiment of the invention. The optical and optoelectronic components of the transceiver 10 are arranged on a support. According to the embodiment, the optical transceiver 10 comprises a temperature regulating unit having a temperature sensor 3 and a thermoelectric cooling element 8 (TEC, thermoelectric cooler). In such embodiment, at least some of the optical and optoelectronic components may be arranged (integrated) on the TEC 8. The TEC 8 (e.g., a Peltier element) may in turn be fastened on a carrier such as a substrate 18. The substrate 18 may consist of silicon, silicon oxide, a glass, a ceramic or plastic or layers of one or more of such materials. According to another embodiment, the TEC 8 and the substrate 18 maybe spatially separated from one another with the TEC 8 thermally conductively connected to the substrate 18, or a light source 1, via a coupling element so that the coupling element thermally couples the TEC 8 to the substrate 18 or the light source 1. The optical and optoelectronic components may be arranged or formed directly on the substrate 18. The TEC 8 may also be arranged beneath the substrate 18, so that the optical and optoelectronic components as well as the TEC 8 are arranged on mutually opposed surfaces of the substrate 18.

The optical transceiver 10 includes a light source 1 which emits light that is radiated by the optical transceiver 10. First coupling optics 5 acts as a collimator for the light radiated by the light source 1 and couples it to a beamsplitter 6 that splits the light from the light source side, for example, onto second coupling optics 15 and a wavelength sensor 7 in a ratio of about 1:1, for example, between the two directions. The second coupling optics 15 focus a first fraction of the light emitted by the light source 1 onto a light guide 11 (e.g., onto the entry face of a glass fiber). A second fraction of the light emitted by the light source 1 shines collimated, or more or less focused, onto the wavelength sensor 7.

Light received by the optical transceiver 10 emerging from the light guide 11 in the direction of the beamsplitter 6 is split in a ratio of 1:1, for example, between a detector 4 and the light source 1 by the beamsplitter 6 or is deviated more or less completely toward the detector 4. The detector 4 is, for example, a PIN photodiode suitable for detecting a modulated interferometer signal when the optical transceiver is employed, for example, in a fiber-optic gyro. The detector 4 generates an electrical detection signal from the light signal contained in the received light beam. In other applications, different types of evaluation and detector may be provided. The optical transceiver 10 may be operated exclusively as a transmitter and without a detector 4. According to an embodiment, the first and second coupling optics 5, 15 face one another across the beamsplitter 6 and the detector 4 and the wavelength sensor 7 also face one another across the beamsplitter 6. Other embodiments may provide alternative arrangements.

One or more polarizers 2, 12 may be provided in the collimated beam paths. A neutral filter 9 can be arranged between the beamsplitter 6 and the wavelength sensor 7 to adapt the light level for evaluation in the wavelength sensor 7. The aforementioned optical and optoelectronic elements may be arranged, for example, together on the TEC 8. According to other embodiments, only some of these elements, with the exception of the second coupling optics 15 and the light guide 11, are arranged on the TEC 8.

The light source 1 is controllable and may be relatively broadband. According to an embodiment, the light source 1 is a semiconductor light source, for example a superluminescent diode (SLD, or ASE diode for amplified simultaneous emission). SLDs have high luminous power with emission bandwidth typically 20 to 100 nm. The light source 1 may be an SLD, for example, which emits light with a central wavelength of about 830 nm and an emission bandwidth of several tens of nanometers.

The wavelength sensor 7 is part of a wavelength stabilization unit which also comprises a regulating circuit. It will be explained in more detail with reference to FIG. 3, a simplified block diagram of an optical transceiver comprising a wavelength stabilization unit in accordance with another embodiment of the invention. The wavelength stabilization unit detects wavelength drift of the light emitted by the light source 1 and, at least partially, compensates. Wavelength drift is an aging-induced change in the wavelength of light emitted by the light source 1 as a function of the operating time of the light source 1. Typically, aging effects in semiconductor light sources lead to a shift of the emission spectrum toward longer wavelengths. SLDs are therefore unstable light sources.

The wavelength sensor 7 comprises, for example, two photodiodes arranged in such a way to have different spectral sensitivities due to their positions. According to one embodiment, the wavelength sensor 7 is a double PIN photodiode, in which two pin junctions are formed vertically above one another in a semiconductor substrate. Due to the differing distances of the two pin junctions from the photosensitive face of the wavelength sensor 7 facing the incident light, the two pin junctions or PIN photodiodes have different spectral sensitivities. The photocurrents of the two photodiodes are amplified and their ratio formed.

Figure 2:
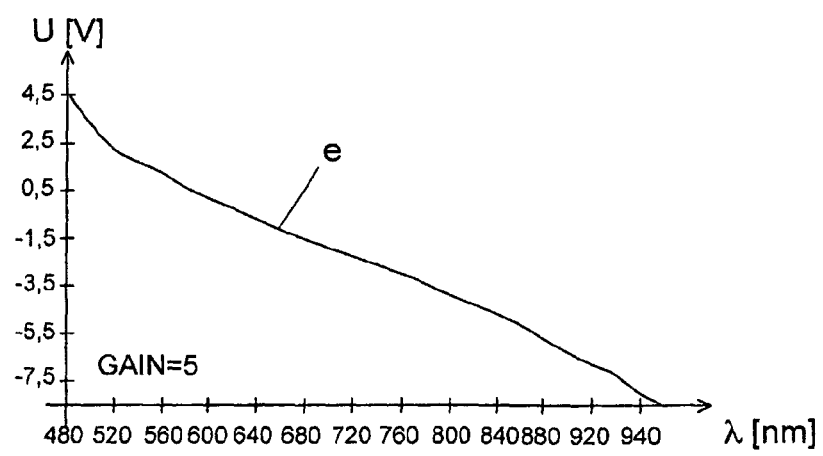
FIG. 2 is a characteristic curve of a wavelength sensor device for an optical transceiver in accordance with another embodiment of the invention.

FIG. 2 is a characteristic curve e of a wavelength sensor for an optical transceiver in accordance with an embodiment of the invention. This illustrates the dependency of an output voltage U, proportional to a ratio signal, of the wavelength sensor, on the central wavelength $\lambda$ of the light received by the wavelength sensor. The central wavelength $\lambda$ is plotted in nanometers on the abscissa, and the output signal U is plotted on a linear scale in volts on the ordinate. The characteristic curve was recorded at a temperature of 22° C. Over wide ranges, there is an almost-linear dependency of the output signal on wavelength. The gain factors of the two photocurrents may be selected in such a way that sensitivity can be improved while maintaining the same linearity.

For the wavelength range of 800 nm to 840 nm, with gain selected for the recorded characteristic curve (Gain=5), there is a sensitivity of about −22 mV/nm. At a wavelength of 820 nm, this corresponds to a voltage difference of about −2 mV for a wavelength change of 120 ppm.

The thermal sensitivity of the double PIN diode is 1 nm/K. According to one embodiment, the wavelength sensor is thermally regulated. For example, the wavelength sensor is arranged on the TEC 8, the thermal stability of which is, for example, about 0.01 K. Therefore, taking into account the remaining temperature effect, the residual nonlinearity of the wavelength sensor, the accuracy of the regulating circuit and the current dependency of the bandwidth for SLDs, a long-term residual error of about 30 ppm or less exists in relation to the tuning or stabilization of the wavelength.

Figure 3:
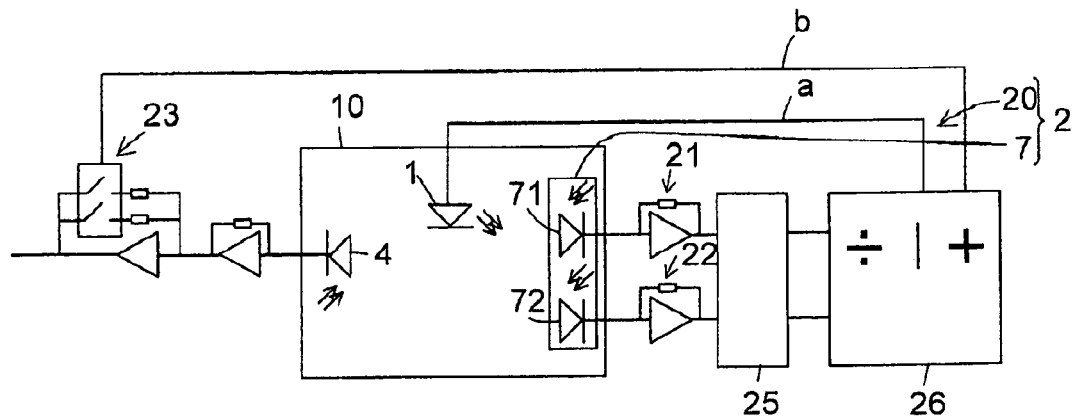
FIG. 3 is a simplified block diagram of an optical transceiver comprising a wavelength stabilization unit in accordance with another embodiment of the invention.

FIG. 3 is a simplified block diagram of a wavelength stabilization unit 27 for a light source 1 of an optical transceiver 10. The wavelength stabilization unit 27 comprises a sensor for determining wavelength drift, e.g. a wavelength sensor 7 having two photodiodes 71, 72 of different spectral sensitivities. The wavelength stabilization unit 27 also comprises a regulating circuit 20, which may have, for example, an amplifier device (e.g., two amplifiers 21, 22 each connected to one of the photodiodes 71, 72) that condition and amplify output signals of the sensor device (e.g., the photocurrents of the photodiodes 71, 72).

According to an embodiment, the regulating circuit 20 also comprises an AD converter 25 for sampling the amplified output signals of the wavelength sensor 7 and a signal processor 26 in which a ratio signal is formed from the amplified and sampled output signals of the sensor device. The regulating circuit 20 or the signal processor 26 may also comprise a memory for a calibration ratio signal and an output driver for the output of a control signal. In another embodiment, the optical transceiver comprises analog circuits for forming the ratio signal, storing the calibration ratio signal and for the output of a control signal. The output driver is connected to the light source 1. For example, the output driver drives a signal for controlling the emission of the light source (e.g., a signal on the cathode or the anode of an SLD). The functionality of components of the wavelength stabilization unit may be embodied in components having additional capabilities and/or may be formed in a substrate to which the TEC is applied.

During operation of the optical transceiver (10), light from the light source 1 enters the photodiodes 71, 72. After amplification and digitization in the signal processor 26, the ratio signal is formed from the photocurrents of the photodiodes 71, 72 and is compared with a calibration ratio signal determined during calibration. If the currently determined ratio differs from the calibration ratio, the central wavelength of the light emitted by the light source 1 is returned by modifying the driver current for the light source 1 to the central wavelength on which the calibration was based. The wavelength stabilization unit 27 thereby suppresses drift of the central wavelength, or the spectrum, of the light emitted by the light source 1 as a function of time.

The wavelength stabilization unit determines and corrects the current position of the emission spectrum of the light emitted by the light source. The wavelength stabilization unit therefore makes it possible to use SLDs for optical transceivers even in applications with high accuracy and stabilization requirements, such as in a fiber-optic gyro for an inertial navigation system. The value of the ratio signal measured during calibration is corrected by adapting the driver current to be virtually constant throughout the lifetime of the light source.

It is also possible to calculate scale factor from measured wavelength change when the wavelength dependency of the wavelength sensor is known (e.g., in the case of a calibrated wavelength sensor). To first approximation, the second scale factor is equal to the first scale factor multiplied by the ratio of the first wavelength and the second wavelength, i.e.

scale factor 2=scale factor $1 \cdot \lambda_1 / \lambda_2$.

Modification of the driver current for the light source may also lead to modification of the optical output power of the light source.

Figure 4:
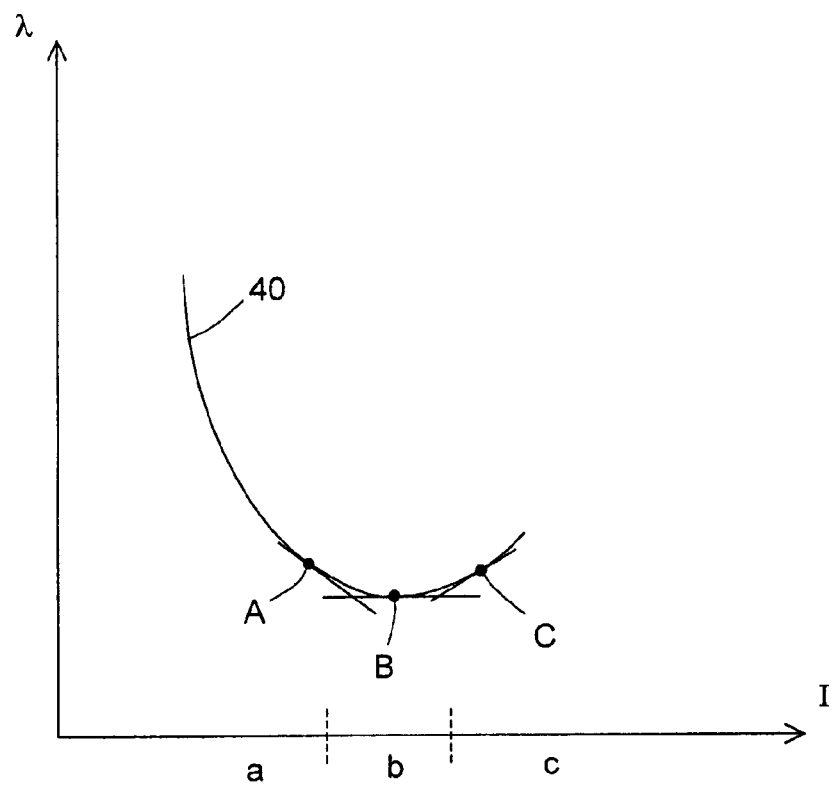
FIG. 4 is a characteristic curve of a superluminescent diode.

FIG. 4, a characteristic curve 40 of a superluminescent diode (SLD), represents the dependency of the wavelength of the light source 1 of FIG. 3 on driver current for the light source 1 as an SLD. The driver current I (in mA) is plotted on the abscissa while wavelength $\lambda$ (in nanometers) is plotted on the ordinate. In a first range a, wavelength increases with increasing driver current. In a second range b, wavelength remains virtually constant as driver current changes while, in a third range c, an increase in driver current produces a longer wavelength. In the first region a, charge carrier injection in the SLD dominates. In the third region, due to high current density in the SLD and the associated increased temperature, thermal effects dominate (thermooptics).

Referring back to FIG. 3, other embodiments of the optical transceiver 10 utilize an SLD which is operated in a working range in the vicinity of the minimum of the characteristic curve 40 of FIG. 4 as the light source 1. For example, the SLD may be operated at a working point A that lies in the first region a to the left of the minimum on the downward section of the characteristic curve 40. According to another embodiment, the SLD may be operated at a working point B that lies at or very close to the minimum of the characteristic curve 40. According to another embodiment, the SLD may be operated at a working point C to the right of the minimum and on the upward section of the characteristic curve 40. Similar considerations apply for other types of semiconductor light sources. In each of the three cases, the working point is determined by the level of driver current.

Aging in SLDs leads not only to an increase in the wavelength of the radiated light but also to a loss of optical power. In aluminum-free SLDs, for example, the optical power at 830 nm is halved after more than 2 million operating hours at 25° C. On the other hand, wavelength dependency on driver current remains unaffected by the aging to first approximation.

If the SLD is operated at working point A, wavelength change in the course of aging can be compensated by increasing driver current since this leads to a decrease in wavelength. By increasing driver current, the optical power decrease associated with aging can be simultaneously increased again. In this case, not only wavelength drift but also the aging-induced decrease in optical power can be at least partially compensated. According to one embodiment, wavelength drift can be fully compensated (or virtually fully) by increasing driver current.

If the SLD is operated at working point B, it is possible to counteract aging-induced drift toward longer wavelengths by either increasing or reducing the driver current. According to one embodiment, aging-induced drift toward longer wavelengths is counteracted to at least a certain extent by increasing the driver current to simultaneously balance the aging-induced decrease in optical power.

If the SLD is operated at working point C, the drift toward longer wavelengths due to aging of the light source can only be compensated by reducing driver current. In this case, however, in addition to aging, the output light power would be reduced proportional to driver current. When using the described optical transceiver in a fiber-optic gyro, a regulator in the fiber-optic gyro for light amplification may correct light losses up to a threshold value of about 3 dB without increasing noise in the electrical path. If light amplification needs to be increased further to compensate electrically for the loss of optical power, this results in increased noise in the electrical path.

Referring again to FIG. 3, embodiments of the optical transceiver 10 are therefore possible that have a detector 4 and a control circuit b that may be constructed independently of the regulating circuit 20 or share resources therewith (e.g., the signal processor 26).

In order to prevent the threshold value from being exceeded at working point C, a circuit 23 is provided in the regulating circuit 20 according to FIG. 3 by means of which the gain factor for the output of the detector 4 can be switched. The signal processor 26 is configured so that, in addition to the ratio signal, the sum signal is formed of the amplified and sampled output signals of the sensor device (e.g., of the output signals of the double PIN photodiode 71, 72). If the sum signal exceeds a predetermined threshold value, the gain factor for an amplifier in the output circuit of the detector 4 is switched in the circuit 23.

In principle, a sum signal may also be used for regulating amplification in the case of the working points A or B, when a power decrease of the light source over time is negligible or balanced in another way.

The working point A may be selected with a minimal negative slope, or no slope, of the characteristic curve 40 (FIG. 4) as a starting value. With the corresponding driver currents, these can be operated within their specification when used in fiber-optic gyros.

According to one embodiment, driver current is limited to at most 80% of the allowed driver current when selecting the working points B and C, so that sufficient regulating latitude is available to compensate for light wavelength and power. A current/optical power characteristic curve has greatest slope in this range. For the SLD, the slope at 80% of maximum current is in the region of the minimum, slightly positive values of less than 0.05 nm/mA and less than 63 ppm/mA being typical. There is likewise reproducibility of results.

For use of SLDs in IN systems, the wavelength spectrum emitted by the SLD should remain stable with a stability of 30 ppm over at least 60,000 h. An accurate estimation of the optical power after 60,000 h is known to a certain extent. With interpolation, it is about 1.5%. From an estimate from measurements, it has been found that the resulting wavelength shift should be less than 0.3 nm (360 ppm). With 80% of maximum driver current and a slightly positive coefficient (>0.015 nm/mA), the 360 ppm wavelength shift can be compensated by increasing driver current.

According to FIG. 1, a polarization device is provided on the thermoelectric cooler 8 coupled to the substrate 18 for polarizing the light from the light source 1 in the collimated light beam path. The polarization device comprises polarizers 2 at two different positions. The first position in the collimated light beam path lies between the light source 1 and the beamsplitter 6 while the second position lies between the beamsplitter 6 and the detector 4. A further polarizer 12 lies between the beamsplitter 6 and the light guide 11. This is used for polarization of light returning from the light guide 11. The light guide 11 may be a fiber that maintains polarization of the light.

In one embodiment, the optical transceiver may be provided with polarizers, and in another embodiment it may be without polarizers. A neutral filter may be provided between the light wavelength sensor 7 and the beamsplitter 6 for adapting a light level before the light wavelength sensor.

The optical transceiver in the embodiment with polarizers and a polarization-maintaining light-guiding fiber may be integrated into a fiber-optic gyro.

The optical transceiver may also be integrated into fiber-optic gyros in other embodiments. It would be possible to couple the optical transceiver to other instruments (e.g., a fiber-optic current sensor or a fiber-optic hydrophone).

FIG. 5 is a simplified overview of a fiber-optic gyro 100, as employed, for example, in a navigation system, comprising an optical transceiver 10. A divider 31 splits the light guided in the light guide 11 into two sub-beams and couples them into a fiber coil 30 in opposite directions. The divider 31 may be a beamsplitter or an integrated optical chip. The fiber coil 30 is a light guide shaped to form a coil having one or more turns such as a wound coil of an optical fiber.

Polarized wavelength-stabilized light is coupled into the polarization-maintaining light-guiding fiber by the optical transceiver 10. The light is split by the divider 31 into two sub-beams that are coupled into the fiber coil 30 so that they travel through the turns of the fiber coil 30 in opposite directions. If the arrangement is in rotation with an angular velocity ω about the normal to the plane of the turns of the fiber coil 30, the path of one sub-beam is shortened while that of the other is correspondingly lengthened, giving different propagation times for the two sub-beams. The phase shift resulting between the two sub-beams is registered as an interference pattern in the detector of the optical transceiver 10 after the sub-beams have been combined. Such phase shift is a measure of the angular velocity at which the fiber-optic gyro is rotating. The angular velocity of the fiber-optic gyro is determined from the output signal of the detector in an evaluation unit.

The effect of the polarizer integrated in the optical transceiver is that light having only one polarization device with, for example, an extinction ratio of 25 dB, leaves the optical transceiver. The internal polarizer in this case may have an extinction ratio of 50 dB. The 25 dB may be due to fiber output coupling, for example after mechanical stress of the light-guiding polarization-maintaining fiber during welding. The light is then guided only in a polarization axis that corresponds to the polarization axis of the integrated optical chip. A depolarizer is therefore no longer required. This means that there are fewer light paths that can lead to bias errors when using the optical transceiver with an integrated polarizer in the fiber-optic gyro.

While the invention has been described with reference to its presently-preferred embodiment, it is not limited thereto. Rather, this invention is limited only insofar as it is defined by the following set of patent claims and includes within its scope all equivalents thereof.

What is claimed is:

1. An optical transceiver comprising:
   a light source which can be controlled by a driver current and emits light, which is radiated by the optical transceiver;
   a wavelength stabilization unit for stabilizing the wavelength of the light emitted by the light source, comprising:
   a sensor device for detecting a wavelength drift;
   a control unit connected to the sensor device and the light source for controlling the driver current as a function of the sensor signals so as to counteract a drift of the wavelength, wherein
   the wavelength stabilization unit comprises a wavelength sensor for determining a central wavelength of the emitted light and a regulating circuit for compensating for a wavelength drift of the emitted light,
   the wavelength sensor comprises two photodiodes of different spectral sensitivity;
   characterized in that
   the optical transceiver comprises a detector for measuring light received by the optical transceiver, an amplifier for amplifying an electrical output signal of the detector with a switchable gain, and a control circuit which is suitable for controlling the gain as a function of a sum signal of output signals of the two photodiodes.

2. The optical transceiver as claimed in claim 1, characterized in that
   the light source is a broadband semiconductor light source.

3. The optical transceiver as claimed in claim 1, characterized in that
   the light source is a superluminescent diode.

4. The optical transceiver as claimed in claim 3, characterized in that
   an emission spectrum of the light source lies below a wavelength of 1000 nm.

5. The optical transceiver as claimed in claim 1, characterized in that
   the regulating circuit is configured to form a ratio signal of output signals of the two photodiodes and to control the driver current so that a value of the ratio signal determined during calibration remains constant.

6. The optical transceiver as claimed in claim 1, characterized by
   a polarization device which is provided between the light source and the detector.

7. The optical transceiver as claimed in claim 6, characterized in that
   the polarization device comprises two polarizers at two positions, the first position being provided in the collimated light beam path between the light source and a beamsplitter and the second position being provided between the beamsplitter and the detector.

8. The optical transceiver as claimed in claim 1, characterized in that
   a polarizer is provided between the beamsplitter and the light-guiding fiber.

9. The optical transceiver as claimed in claim 1, characterized by a temperature control device having
   a temperature sensor which detects temperature variations; and
   a thermoelectric cooler which balances temperature variations.

10. An operating method for an optical transceiver, comprising the steps of:
    determining a current central wavelength of an emission band of a light source of the optical transceiver;

comparing the current central wavelength with a reference central wavelength of the emission band;

controlling the light source so that the current central wavelength of the emission band is brought to coincide with the reference central wavelength, wherein the current central wavelength is determined from a ratio signal formed from output signals of two photodiodes of different spectral sensitivity, to which the light from the light source is incident; and controlling a gain of a detector of the optical transceiver as a function of a sum signal formed from the output signals of the two photodiodes of different spectral sensitivity.

11. The operating method as claimed in claim 10, characterized in that the reference central wavelength of the emission band is determined in a calibration step.

12. The operating method as claimed in claim 10, characterized in that the light source is controlled by means of a driver current which is delivered to the light source and imposes a current across a pn junction in the light source.

13. The operating method as claimed in claim 12, characterized in that a working point of the light source is selected so that a shift of the emission band to longer wavelengths can be compensated for by increasing the driver current.

14. The operating method as claimed in claim 12, characterized in that a working point of the light source is selected so that a shift of the emission band to longer wavelengths can be compensated for by reducing the driver current.

15. A fiber optic gyroscope comprising:

an optical transceiver including: a light source which can be controlled by a driver current and emits light, which is radiated by the optical transceiver; and a wavelength stabilization unit for stabilizing the wavelength of the light emitted by the light source, said wavelength stabilization unit including: a sensor device for detecting a wavelength drift; a control unit connected to the sensor device and the light source for controlling the driver current as a function of the sensor signals so as to counteract a drift of the wavelength wherein said wavelength stabilization unit comprises a wavelength sensor for determining a central wavelength of the emitted light and a regulating circuit for compensating for a wavelength drift of the emitted light, said wavelength sensor comprising two photodiodes of differing spectral sensitivities, a detector for measuring light received by the optical transceiver, an amplifier for amplifying an electrical output signal of the detector with a switchable gain, and a control circuit which is suitable for controlling the gain as a function of a sum signal of output signals of the two photodiodes, a divider arranged to receive a beam of wavelength-stabilized light output from said transceiver, split said beam into a pair of sub-beams, then recombine said sub-beams upon exiting a loop of optical fiber and to direct said recombined beam to said detector of said optical transceiver, said loop of optical fiber being arranged to receive said pair of sub-beams at opposed ends to counterpropagate therein, so that a phase shift between the sub-beams is detected as an interference pattern indicative of rotation rate by said detector.

16. The fiber optic gyroscope as defined in claim 15 additionally comprising said divider comprises an integrated optical chip having a polarization axis, an optical fiber having the polarization axis of said integrated optical chip guides light between said transceiver and said integrated optical chip.

17. A navigation system comprising at least one fiber optic gyroscope, said at least one fiber optic gyroscope comprising:

an optical transceiver including: a light source which can be controlled by a driver current and emits light, which is radiated by the optical transceiver; and a wavelength stabilization unit for stabilizing the wavelength of the light emitted by the light source, said wavelength stabilization unit including: a sensor device for detecting a wavelength drift; a control unit connected to the sensor device and the light source for controlling the driver current as a function of the sensor signals so as to counteract a drift of the wavelength wherein said wavelength stabilization unit comprises a wavelength sensor for determining a central wavelength of the emitted light and a regulating circuit for compensating for a wavelength drift of the emitted light, said wavelength sensor comprising two photodiodes of differing spectral sensitivities, a detector for measuring light received by the optical transceiver, an amplifier for amplifying an electrical output signal of the detector with a switchable gain, and a control circuit which is suitable for controlling the gain as a function of a sum signal of output signals of the two photodiodes, a divider arranged to receive a beam of wavelength-stabilized light output from said transceiver, split said beam into a pair of sub-beams, then recombine said sub-beams upon exiting a loop of optical fiber and to direct said recombined beam to said detector of said optical transceiver, said loop of optical fiber being arranged to receive said pair of sub-beams at opposed ends to counterpropagate therein, so that a phase shift between the sub-beams is detected as an interference pattern indicative of rotation rate with respect to at least one axis by said detector.

* * * * *